United States Patent [19]
Segal et al.

[11] Patent Number: 5,506,709
[45] Date of Patent: Apr. 9, 1996

[54] ELECTRO-OPTICAL COMMUNICATION STATION WITH BUILT-IN TEST MEANS

[75] Inventors: Yigal Segal, Kiryat Bialik; David Halido; Imanuel Weinberger, both of Haifa, all of Israel

[73] Assignee: The State of Israel, Ministry of Defence, Rafael Armament Development Authority, Tel Aviv, Israel

[21] Appl. No.: 280,595

[22] Filed: Jul. 29, 1994

[30] Foreign Application Priority Data

Jul. 27, 1993 [IL] Israel .................................... 106495

[51] Int. Cl.⁶ ............................................ H04B 10/08
[52] U.S. Cl. ...................... 359/110; 359/152; 371/20.1; 370/13
[58] Field of Search ........................ 359/110, 113, 359/143–144, 147, 152, 167; 370/13; 371/20.1

[56] References Cited

U.S. PATENT DOCUMENTS

| | | | |
|---|---|---|---|
| 4,994,675 | 2/1991 | Levin et al. ......................... | 359/110 |
| 5,210,703 | 5/1993 | Hodgson ............................. | 359/178 |
| 5,345,230 | 9/1994 | Jackson et al. ..................... | 359/110 |
| 5,367,394 | 11/1994 | Chuter et al. ...................... | 359/110 |

FOREIGN PATENT DOCUMENTS 2131248  6/1984  United Kingdom .................. 359/110

*Primary Examiner*—Jose L. Couso
*Assistant Examiner*—Kinfe-Michael Negash
*Attorney, Agent, or Firm*—Helfgott & Karas

[57] ABSTRACT

A station-to-station communication system with a built-in testing arrangement in at least one of the stations. The testing arrangement includes a transmitter/receiver pair with associated light/electricity and electricity/light transducers connectable at will by controlled switching means. When the transmitter/receiver pair is connected to each other, electro-optical light signals emitted by the transmitter are returned to the receiver and produce perceptible signals.

20 Claims, 5 Drawing Sheets

ELECTRO-OPTICAL COMMUNICATION STATION WITH BUILT-IN TEST MEANS

FIELD OF THE INVENTION

The present invention concerns a station-to-station communication system of the kind in which each station comprises an electro-optical terminal unit having a transmitter with associated electricity/light transducer serving as light signal emitter, and/or a receiver with associated light/electricity transducer serving as light signal sensor, and the two stations are linked to each other by one or more light waveguides such as optical fiber. More specifically, the invention concerns built-in test means enabling the operator to establish whether a station of the system is functioning.

BACKGROUND OF THE INVENTION

There are many instances of station-to-station communication systems employing optical signals transmitted between the stations via one or more waveguides, a typical case being a remotely controlled vehicle which is guided from a stationary control station. In such a system, control signals are transmitted from the control station to the vehicle and signals produced by sensors in the remote vehicle, e.g. by a television camera or other sensor means, are transmitted from the vehicle to the control station. Another example is a point-to-point intercommunication system in which two users communicate directly with each other.

In communication systems of this kind, it is important that the operator should have built-in means for testing at least one of the communicating stations, e.g. the control station in case of a system for the remote control of a moving vehicle, in order to determine whether or not that station is functioning properly.

Known communication systems of the kind specified do not have a built-in testing means and it is therefore the object of the present invention to provide for the first time communication systems of the kind specified with built-in testing means in at least one of the stations.

SUMMARY OF THE INVENTION

In accordance with the present invention there is provided a station-to-station optical communication system comprising first and second stations linked to each other by at least one main light waveguide and having each an electro-optical terminal unit holding at least one member selected from the group of transmitters with associated electricity/light transducer means serving as light signal emitters and receivers with associated light/electricity transducer means serving as light signal sensors, each of said first and second stations having light waveguide connector means for connection thereto of said at least one light waveguide, characterized by built-in electro-optical testing means in the terminal unit of at least one of said first and second stations being a tested station, which testing means comprise a transmitter/receiver pair with associated electricity/light and light/electricity transducers, switching means for connecting in a controlled fashion the transmitter and receiver of said transmitter/receiver pair to each other, means for returning emitted light signals produced by the electricity/light transducer so as to propagate in a confined fashion to the receiver of said transmitter/receiver pair, and means associated with the receiver for the production of perceptible signals.

A station of a communication system according to the invention with built-in testing means is referred to hereinafter as "tested station".

As a rule, testing of a tested station by means of built-in testing means in accordance with the present invention will be carried out when the tested station is disconnected from the other one, i.e. when the main light waveguide linking the two stations is disconnected from the electro-optical terminal of the tested station.

It is to be noted that connection between a transmitter and receiver in a built-in testing arrangement according to the invention always occurs via the associated electricity/light and light/electricity transducers. The switching means by which such connection is established in a controlled fashion may be manual or be operated by remote control.

Regular uni-directional, electro-optical station-to-station communication systems comprise either at least one transmitter or at least one receiver. Accordingly, for making such a station into a tested station with built-in testing means in accordance with the teachings of the present invention, a transmitter/receiver pair has to be provided by adding a dedicated transmitter or receiver unit, as the case may be. Such added unit must be tuned to the receiver or transmitter format, as the case may be, at which the regular system operates so as to emulate the terminal in the other station of the system.

Regular bi-directional, electro-optical station-to-station communication systems have in each terminal both a transmitter and a receiver. Depending on the characteristics of the system, the terminal of the tested station of such a bi-directional system may or may not require the incorporation of a dedicated transmitter or receiver unit.

The perceptible signals triggered off by the electric signals arriving at the receiver of the tested station may be audible, visible or both.

The transmitter or receiver of the tested station which in accordance with the invention becomes optically linked with a receiver or transmitter within the same station when the testing means are switched on, may be a regular transmitter or receiver of the electro-optical terminal unit of that station or else an added, dedicated transmitter or receiver. For example, in case the tested station serves for the remote control of a moving vehicle (manipulated station) and in which the receiver unit is tuned-in to the transmitter of the manipulated station and is out of tune with the regular transmitter in the control station, the built-in testing system must include an added, test dedicated transmitter having modulation characteristics similar to those of the transmitter in the manipulated station, in order to emulate the latter in the performance of the built-in testing. On the other hand, where the two stations are of similar design with similar transmitter and receiver devices, the built-in testing system may make use of an existing regular transmitter.

The qualification that the reflected light propagates in a confined fashion to the receiver of the transmitter/receiver pair, means that the light travels via a secondary light waveguide such as, for example, an optical fiber.

The invention further provides for use in a station-to-station optical communication system, an electro-optical terminal unit comprising at least one member selected from the group of transmitters with associated electricity/light transducer means and receivers with associated light/electricity transducer means and having light waveguide connector means, characterized by built-in testing means comprising a transmitter/receiver pair with associated electricity/light and light/electricity transducers, switching means for connecting with each other in a controlled fashion the transmitter and receiver of said transmitter/receiver pair, means for returning light signals produced by the electricity/light transducer so as to propagate in a confined fashion to the receiver of said transmitter/receiver pair, and means associated with the receiver for the production of perceptible signals.

In accordance with one embodiment of the invention, said built-in testing means include a dedicated transmitter or, alternatively, a dedicated receiver.

The invention further provides a station for use in optical communication systems, fitted with an electro-optical terminal of the kind specified.

In accordance with one embodiment of the invention, use is made of the intrinsic optical reflection characteristic to the termination of an optical fiber, such as in the connector of the electro-optical terminal.

In accordance with another embodiment of the invention, an optical short circuiting add-on device is connected to the light waveguide connector means of the electro-optical terminal when the latter is disconnected from the main light waveguide, which device comprises a connector, a 1×2 light waveguide splitter and a light waveguide loop linking two branch lines of said splitter. The description "1×2 light waveguide splitter" used herein denotes a splitter with one input/output line and two branch lines. Such a splitter is suitable for use with optical fiber lightguides.

In accordance with yet another embodiment of the invention, the tested station comprises a first connector for optical linkage to the other station by means of a main light waveguide, a second connector and a secondary light waveguide permanently connected to said second connector and optionally connectable to the first connector when the latter is disconnected from the main light waveguide leading to the second station.

In accordance with still another embodiment of the invention, the electro-optical terminal unit is fitted with a reflector device with a permanently connected secondary light waveguide connectable to the connector of the electro-optical terminal unit when said connector is disconnected from the main light waveguide.

DESCRIPTION OF THE DRAWINGS

For better understanding the invention will now be described, by way of example only, with reference to the annexed drawings in which.

DESCRIPTION OF SPECIFIC EMBODIMENTS

Figure 1:
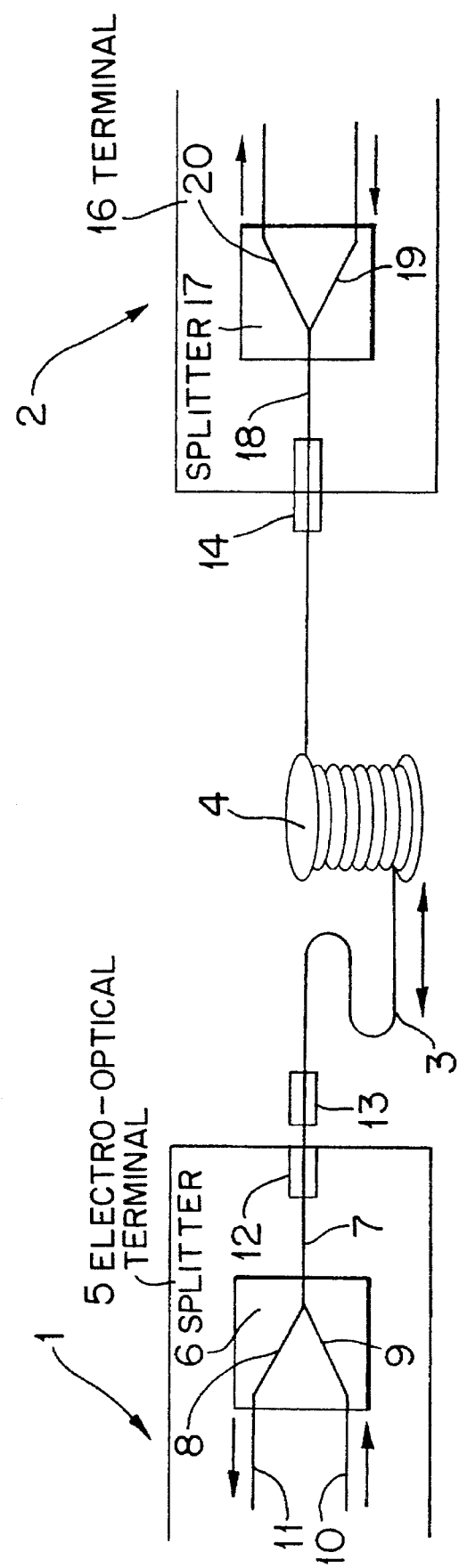
FIG. 1 is a diagrammatic illustration of a bi-directional electro-optical station-to-station communication system with a single optical fiber cable, to which the present invention is applicable.

Attention is first directed to FIG. 1 which is a diagrammatic illustration of a station-to-station optical communication system of a kind to which the present invention is applicable. The system of FIG. 1 comprises a first, stationary control station 1 and a second, manipulated station 2 mounted, for example, on a remotely controlled vehicle. The two stations are optically linked to each other by a main light waveguide in form of an optical fiber cable 3 wound on a drum or bobbin 4, from which the fiber cable is laid out as the remotely controlled vehicle moves away from control station 1. The first, stationary control station 1 has an electro-optical terminal unit 5 holding a transmitter with associated electricity/light transducer serving as a light emitter and a receiver with associated light/electricity transducer serving as a light sensor (which transmitter, receiver and transducers are not shown) all as known per se. The transmitter and receiver are connected through a 1×2 light waveguide splitter 6 having an input/output line 7 and branch lines 8 and 9. Line 9 is linked via a light waveguide 10, e.g. an optical fiber, to a transmitter (not shown), line 8 is linked via a light waveguide 11 to a receiver (not shown); and line 7 is linked to a connector 12.

At one of its ends the optical fiber 3 comprises a connector 13 which in the operative state is connected to connector 12, while the other end of optical fiber 3 is permanently linked to a connector 14 of station 2.

Station 2 comprises a terminal 16 of a kind known per se and having a 1×2 light waveguide splitter 17 with an input/output line 18 and branch lines 19 and 20. Line 20 leads via a light waveguide to an electricity/light transducer associated with a transmitter (not shown) having different modulation characteristics than those of the transmitter of station 1. Line 19 leads via a light waveguide to a light/electricity transducer associated with a receiver (not shown) and line 18 leads to the connector 14 and thus connects to optical fiber 3.

The arrows in terminals 5 and 16 signify the direction of the optical signals in and out of splitters 6 and 17, and the double arrow next to optical fiber 3 signifies that the latter is bi-directional meaning that the communication signals between stations 1 and 2 propagate therethrough in both directions.

In the non-operational state the optical fiber 3 is disconnected from the control station 1, as signified in FIG. 1 by the empty space between connectors 12 and 13. Prior to operation, before connecting fiber 3 to connector 12 of the electro-optical terminal 5 of station 1, it is important to determine whether station 1, the tested station, is functioning and this is achieved by means of built-in test means according to the present invention.

Figure 2:
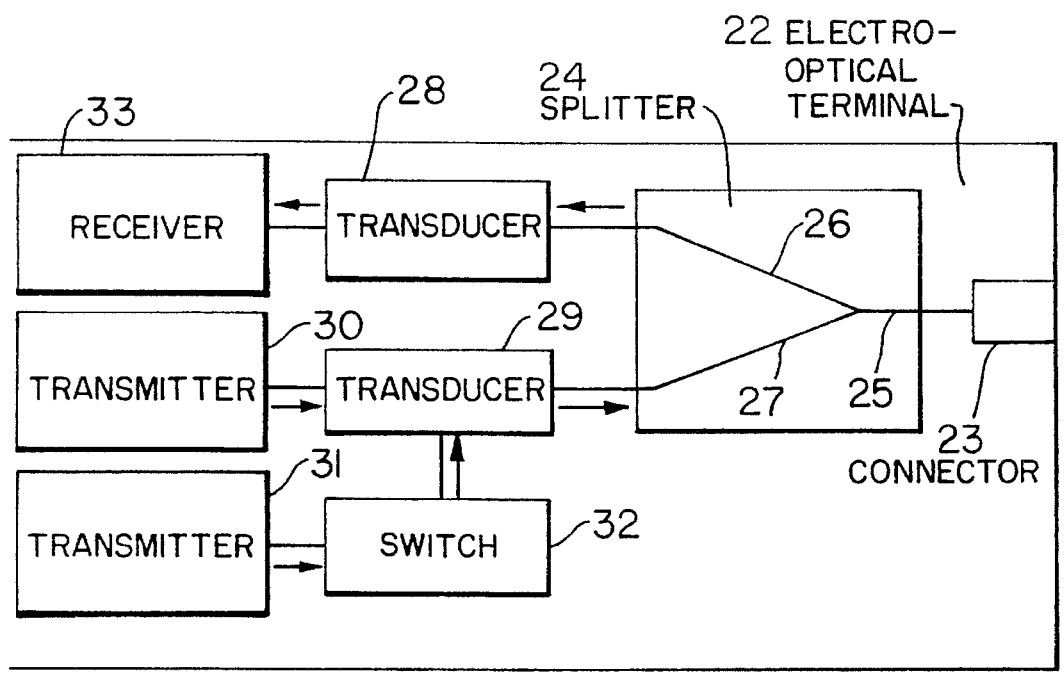
FIG. 2 is a block diagram of a terminal in a station of a system according to FIG. 1, with built-in testing means according to the invention.

Attention is now directed to FIG. 2 which is a block diagram of built-in test means according to the invention. As shown, the built-in test means of FIG. 2 comprises an electro-optical terminal 22 holding a connector 23, a 1×2 light waveguide splitter 24 with lines 25, 26 and 27, a light/electricity transducer 28 serving as light sensor and linked to a receiver 33, and an electricity/light transducer 29 serving as light source and linked to a transmitter 30 which is the regular transmitter of station 1.

In accordance with the invention there is provided a second, test dedicated transmitter 31 with modulation characteristics similar to those of the transmitter in a second, manipulated station such as station 2 in FIG. 1, associated with manually or remotely operable switching means 32. The dedicated transmitter 31 is required because the receiver 33 of unit 22 is tuned in on the transmitter of the second station which has different modulation characteristics than the regular transmitter 30 in station 1. Consequently, for built-in test means of the electro-optical terminal 22 a further transmitter is required with modulation characteristics similar to those of the transmitter of the second station.

Connector 23 is of the kind which, when it is disconnected from the optical waveguide 3 in FIG. 1, is capable of reflecting light and any reflected light propagates in a confined fashion through lines 25 and 26 into the transducer 28 from whereby the resulting electrical signals are transmitted to the receiver (not shown) where visible and/or audible signals are triggered off.

When the switching device 32 is actuated, transmitter 31 is switched on and is electrically connected to transducer 29 whereby light signals are produced and fed via splitter 24 to the connector 23 from where they are reflected back via splitter 24 to the transducer 28 from where an electric signal is sent to the receiver, which in turn activates a device (not shown) that produces visible or audible signals.

Figure 3:
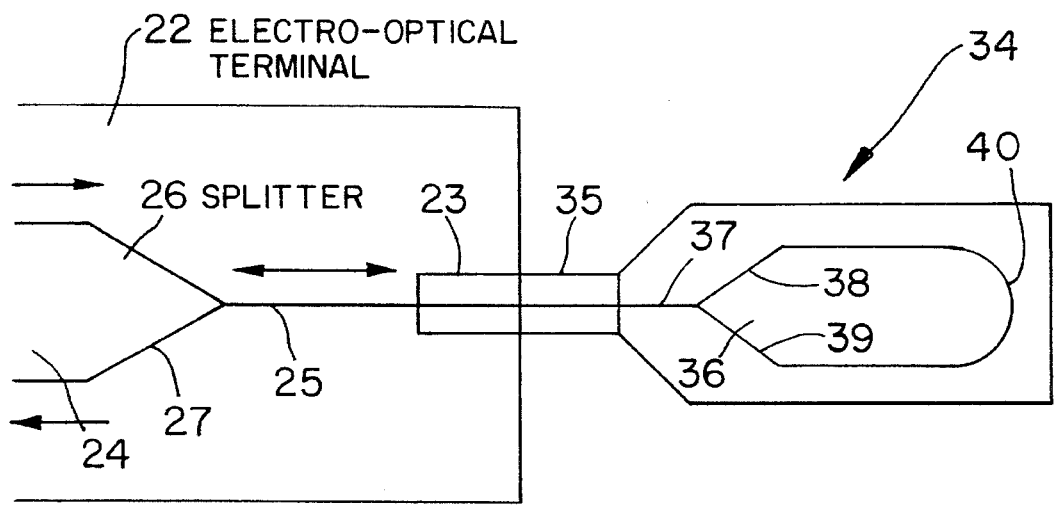
FIGS. 3, 4 and 5 show different embodiments for the confined conduction of light in a built-in testing arrangement according to the invention.
Figure 4:
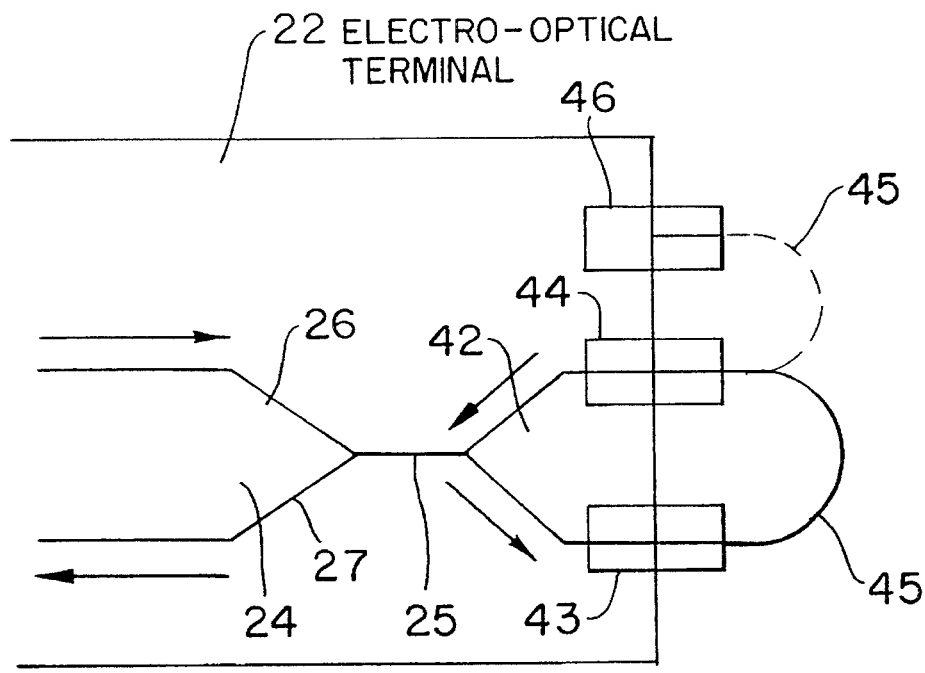
Figure 5:
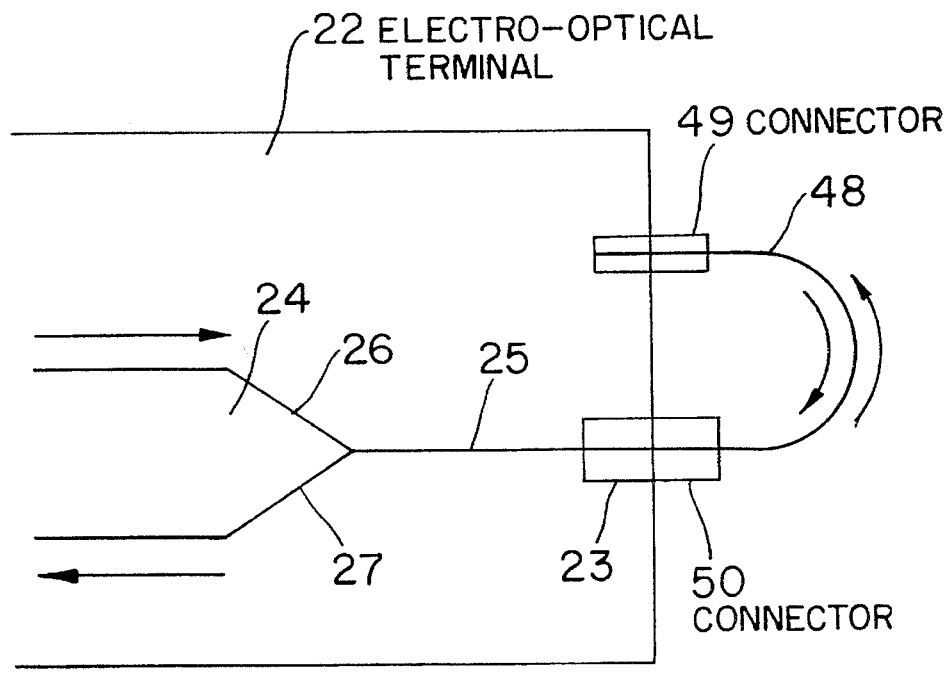

Attention is now directed to FIGS. 3, 4 and 5 which show alternative means for returning to the receiver associated transducer 28 light signals produced by transducer 29 upon activation by transmitter 31 when switching device 32 is switched on. The embodiment of FIG. 3 comprises a device 34 having an optical connector 35 connectable to connector 23 of the electro-optical terminal 22 and holding a 1×2 light waveguide splitter 36 with lines 37, 38 and 39, the first of which connects via connectors 35 and 23 to line 25 of splitter 24, while the latter two are interconnected by means of a light waveguide loop 40. When switch 32 is operated, transducer 29 is activated and the light signal propagates through loop 40 and reaches the light/electricity transducer of terminal 22.

In the embodiment of FIG. 4 the terminal 22 comprises a second splitter 42 linked to splitter 24 and connecting a first connector 43 with a second connector 44. The first connector 43 serves for optical linkage to the second station. A secondary light waveguide 45 is permanently linked to the second connector 44 and can be optionally linked at its other end either to the first connector 43 or else to a dead-end socket 46. When the secondary light waveguide 45 is linked to the first connector 43 a closed loop is formed and a light signal arriving from splitter 26 is returned via splitter 42 to the light/electricity transducer of terminal 22 (not shown).

In accordance with the embodiment of FIG. 5 there is provided a secondary light waveguide 48 with a reflective end at reflector 49 integral with unit 22, and bearing at its opposite end a connector 50 which is connectable to connector 23 of terminal 22. When the secondary waveguide 48 is connected as shown in FIG. 5, a light signal arriving from splitter 24 is reflected by reflector 49 and propagates towards the receiver of terminal 22.

It will be readily understood by those skilled in the art, that for the confined propagation of light in the tested station it is possible in accordance with the invention to use any optical device by which an optical signal arriving from an electricity/light transducer in the electro-optical terminal is short circuited and conducted back to the receiver of the same terminal.

It will further be readily understood by those skilled in the art, that where in a bi-direction system of the kind shown in FIG. 1, the transmitter of the second station has the same modulation characteristics as the one in the first station with the consequence that the receivers in both stations are tuned alike, there is no need for an additional, dedicated transmitter and the built-in test arrangement according to the invention can make use of the regular transmitter within the electro-optical terminal of the tested station.

Figure 6:
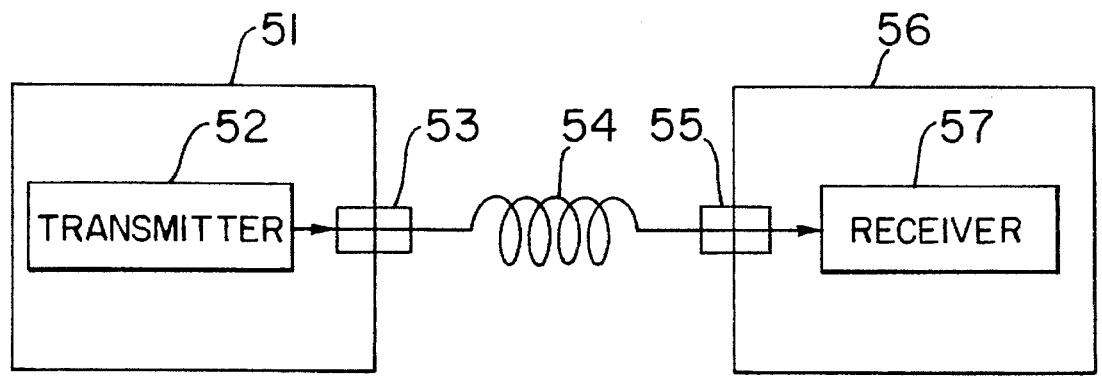
FIG. 6 is a diagrammatic illustration of a unidirectional station-to-station electro-optical communication system to which the invention is applicable.

Attention is now directed to FIG. 6, which shows diagrammatically a unidirectional station-to-station electro-optical communication system to which the invention is applicable. As shown, a first transmitter station 51 has a transmitter 52 with an associated electricity/light transducer (not shown), is linked by connector means 53 to one end of an optical fiber cable 54 whose other end is linked via connector means 55 to a second, receiver station 56 holding a receiver 57 with an associated electricity/light transducer (not shown).

Figure 7:
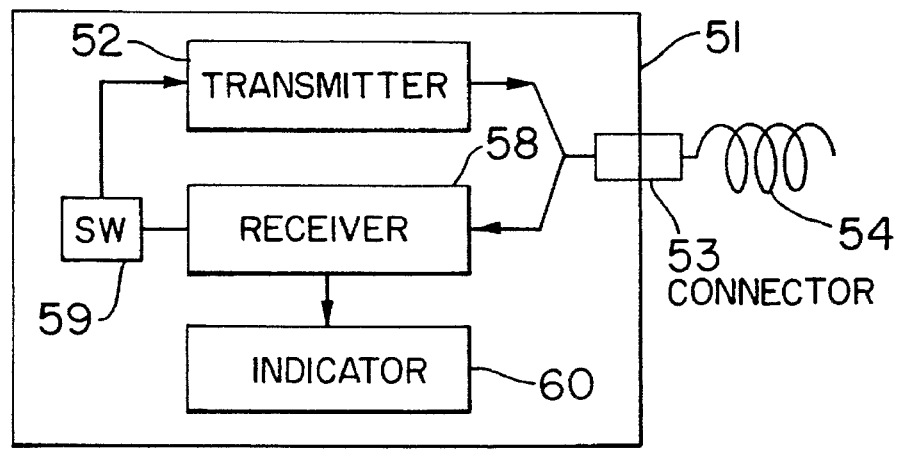
FIG. 7 is a block diagram of a terminal in a transmitter station of a system according to FIG. 6, fitted with built-in testing means according to the invention.

FIG. 7 shows by way of a block diagram a transmitter station in a system according to FIG. 6, fitted with built-in test means in accordance with the invention, members corresponding to those of FIG. 6 being designated with the same numerals. As shown, additional to transmitter 52, station 51 now has a dedicated receiver 58 with an associated light/electricity transducer (not shown), a switching device 59 and indicator means 60. Connector 53 is associated with a 1×2 light waveguide splitter which for simplicity of illustration is not shown. As before, the arrows signify the directions of optical signals.

When the switching device 59 is operated, both the regular emitter 52 and the dedicated receiver 58 are switched on and light signals emitted by the emitter transducer associated with 52 are reflected at connector 53 after disconnection of the optical fiber 54 (not shown in FIG. 7), to receiver 58 similar as in FIG. 2, whereby the indicator means 60 are activated.

Figure 8:
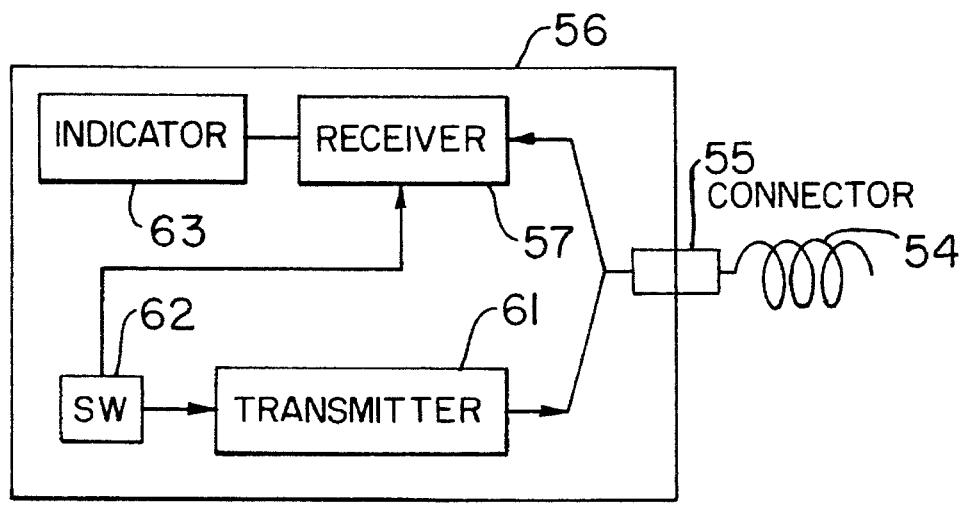
FIG. 8 is a block diagram of a terminal in a receiver station of a system according to FIG. 6, fitted with built-in testing means according to the invention.

FIG. 8 shown by way of a block diagram a receiver station in a system according to FIG. 6, fitted with built-in test means in accordance with the invention, members corresponding to those of FIG. 6 being designated with the same numerals. Similar as in FIG. 7, connector 55 is associated with a 1×2 light waveguide splitter which is not shown. As shown, additional to the receiver 57, station 56 now has a dedicated transmitter 61, a switching device 62 and indicator means 63.

When the switching device 62 is operated, the dedicated transmitter 61 and the regular receiver 57 are switched on and light signals emitted from the transducer associated with transmitter 61 are reflected at connector 55 after disconnection of the optical fiber 54 (not shown in FIG. 8), to the receiver 52 which activates the indicator means 62.

FIGS. 7 and 8 show how a built-in testing arrangement according to the invention can be adapted to the nature of the tested station and will comprise either a dedicated receiver or a dedicated transmitter. Evidently, in a point-to-point electro-optical communication system according to FIG. 6 either or both stations may be fitted with built-in testing means in accordance with the invention.

Figure 9:
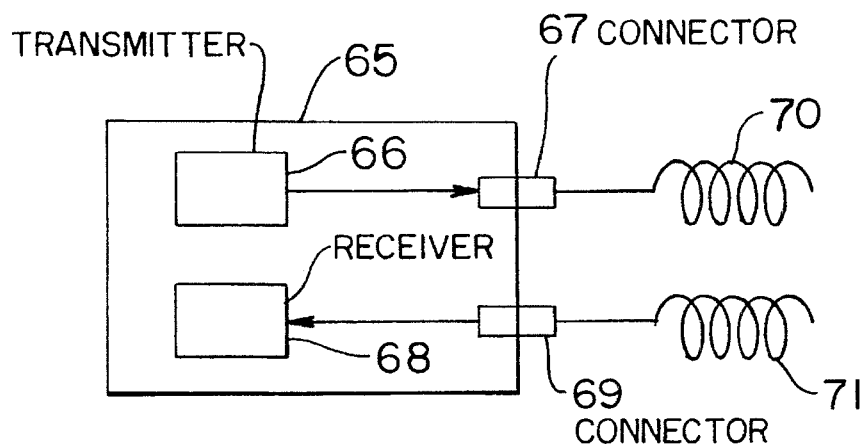
FIG. 9 is a diagrammatic illustration of one station of a bi-directional station-to-station electro-optical communication system with two optical fiber cables, to which the invention is applicable.

FIG. 9 illustrates diagrammatically one station of a bi-directional, two-cable, point-to-point electro-optical communication system to which the invention is applicable. As shown, a station 65 has a regular transmitter 66 with associated light/electricity transducer (not shown), linked to a connector 67; and a regular receiver 68 with associated light/electricity transducer (not shown), linked to a connector 69. Optical fiber cables 70 and 71 serve for connection to a mating station.

Figure 10:
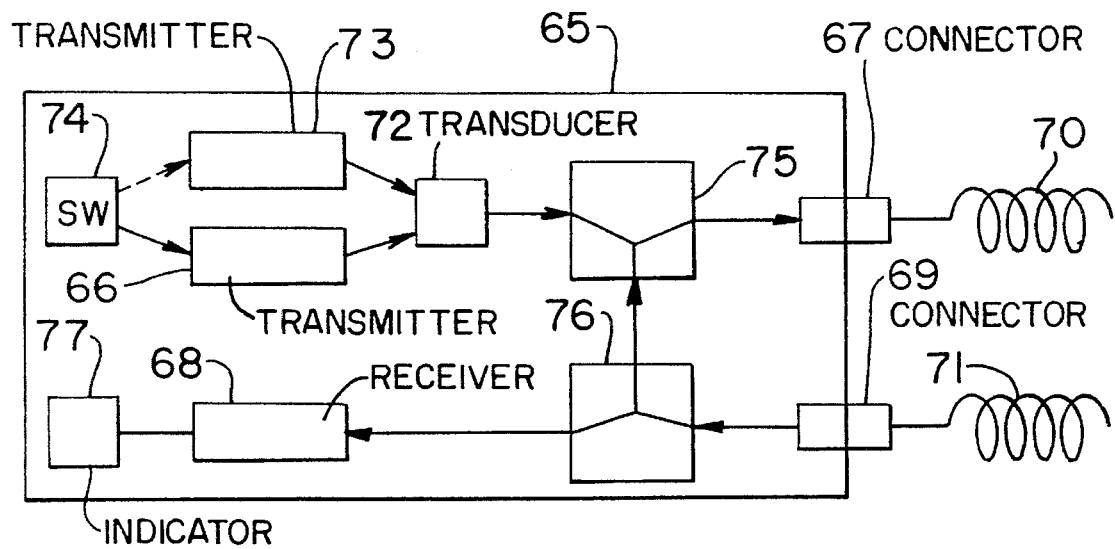
FIG. 10 is a block diagram of a terminal in a station of a system according to FIG. 9, fitted with built-in testing means according to the invention.

FIG. 10 is a block diagram of a terminal of the kind shown in FIG. 9, fitted with a built-in testing arrangement in accordance with the invention, members corresponding to those of FIG. 9 being designated with the same numerals. As shown, additional to the regular transmitter 66 which is here shown with the associated light/electricity transducer 72, station 65 comprises a second, dedicated transmitter 73 connected in parallel to the same light/electricity transducer 72. A two-way switch 74 serves for alternatively switching on of the regular transmitter 66 and the dedicated transmitter 73. Two 1×2 light waveguide splitters 75 and 76 ensure for either linkage or the regular transmitter 66 with terminal 67 or the linkage of the dedicated transmitter 73 with terminal 67 and receiver 68. The receiver 68 is associated with indicator means 77.

In normal operation switch 74 is set to switch on the regular transmitter 66. For testing prior to operation, switch 74 is shifted to switch on the dedicated transmitter 73 and light signals emitted from transducer 72 are reflected at connector 67 and/or connector 69 and then reach receiver 68 whereby indicator means 77 are activated.

In all of FIG. 7, 8 and 10 the reflection of light signals at the connectors 53, 55, 67 and/or 69 is assumed to occur as in FIG. 2. It should, however, be noted that any other suitable reflection facilities may be employed, e.g. such as are shown in any of FIGS. 3, 4 and 5.

We claim:

1. A station-to-station electro-optical communication system comprising first and second stations linked to each other by at least one main light waveguide and having each an electro-optical terminal unit holding at least one member selected from the group of transmitters with associated electricity/light transducer means serving as light signal emitters and receivers with associated light/electricity transducer means serving as light signal sensors, each of said first and second stations having light waveguide connector means for connection thereto of said at least one main light waveguide, and built-in electro-optical testing means provided in the electro-optical terminal unit of at least one of said first and second stations being a tested station, said testing means comprising a transmitter/receiver pair with associated electricity/light and light/electricity transducers, switching means for connecting in a controlled fashion the transmitter and receiver of said transmitter/receiver pair with each other, means for returning emitted light signals produced by the electricity/light transducer so as to propagate in a confined fashion to the receiver of said transmitter/receiver pair, and means associated with the receiver for the production of perceptible signals, said tested station being adapted to be tested when said at least one main light waveguide is disconnected from the electro-optical terminal unit therein.

2. The communication system of claim 1, wherein said switching means are operated manually.

3. The communication system of claim 2, wherein said switching means are operated by remote control.

4. The communication system of claim 1, adapted for bi-directional communication, wherein each of said first and second stations has a regular transmitter and a receiver, and wherein at least one of the stations which is a tested station has an additional, testing dedicated transmitter.

5. The communication system of claim 4, wherein said first and second stations are linked by a single optical fiber cable.

6. The communication system of claim 4, wherein said first and second stations are linked by two optical fiber cables.

7. The communication system of claim 1, adapted for a unidirectional communication, wherein the first station has a transmitter and the second station has a receiver, and wherein said first station is the tested station and has an additional, testing dedicated receiver.

8. The communication system of claim 1, adapted for a unidirectional communication, wherein the first station has a transmitter and the second station has a receiver, and wherein said second station is the tested station and has an additional, testing dedicated transmitter.

9. The communication system of claim 1, adapted for a unidirectional communication, wherein the first station has a transmitter and the second station has a receiver, and wherein said first station is the tested station and has an additional, testing dedicated receiver and said second station is a second tested station and has an additional, testing dedicated transmitter.

10. The communication system of claim 1, wherein said means for returning light signals is a light reflecting connector.

11. The communication system of claim 1, wherein said means for returning light signals is an add-on device comprising a connector, a 1×2 light waveguide splitter and a secondary optical waveguide loop linking two branch lines of said light waveguide splitter.

12. The communication system of claim 1, wherein the electro-optical terminal of the tested station comprises a first light waveguide connector for optical linkage to the other station by means of a main light waveguide, a second light waveguide connector and a secondary light waveguide permanently connected to said secondary light waveguide connector and optionally connectable to said first light waveguide connector when the latter is disconnected from the main light waveguide.

13. The communication system of claim 1, wherein the electro-optical terminal unit is fitted with a reflector device having a permanently connected secondary light waveguide connectable to the light waveguide connector when the latter is disconnected from the main light waveguide.

14. An electro-optical terminal unit for incorporation in a station of a station-to-station communication system, the terminal unit comprising at least one member selected from the group of transmitters with associated electricity/light transducer means and receivers with associated light/electricity transducer means and having light waveguide connector means for connecting the terminal unit to a main light waveguide, and built-in testing means comprising a transmitter/receiver pair with associated electricity/light and light/electricity transducers, switching means for connecting in a controlled fashion, the transmitter and receiver of said transmitter/receiver pair to each other, means for returning light signals produced by said electricity/light transducer so as to propagate in a confined fashion to the receiver of said transmitter/receiver pair, and means associated with the receiver for the production of perceptible signals.

15. The electro-optical terminal unit of claim 14, adapted to operate as a transmitter unit and comprising an additional, testing dedicated receiver.

16. The electro-optical terminal unit of claim 14, adapted to operate as a receiver unit and comprising an additional, testing dedicated transmitter.

17. The electro-optical terminal unit of claim 14, wherein said switching means are operated manually.

18. The electro-optical terminal unit of claim 14, wherein said switching means are operated by remote control.

19. The electro-optical terminal unit of claim 14, wherein said means for returning emitted light is selected from the group consisting of a light reflecting connector, an add-on device comprising a connector, a 1×2 light. waveguide splitter and a secondary optical waveguide loop linking two branch lines of said light waveguide splitter, a secondary light waveguide connector and a secondary light waveguide permanently connected to said secondary light waveguide connector and optionally connectable to said first light waveguide connector means when said first light waveguide connector means is disconnected from said main light waveguide.

20. A station for use in electro-optical communication systems, fitted with a terminal unit according to claim 14.

* * * * *